June 2, 1970  O. M. SUMMERS  3,515,199
METHOD AND APPARATUS FOR RECOVERING SOLIDS DISSOLVED
OR SUSPENDED IN A LIQUID SOLVENT
Filed Nov. 20, 1967

INVENTOR
OTTO MURRAY SUMMERS
BY
Melvin A. Crosley

United States Patent Office 3,515,199
Patented June 2, 1970

3,515,199
METHOD AND APPARATUS FOR RECOVERING SOLIDS DISSOLVED OR SUSPENDED IN A LIQUID SOLVENT
Otto Murray Summers, Glasgow, Ky., assignor to Lincoln Valley Minerals Incorporated, Glasgow, Ky., a corporation of Kentucky
Filed Nov. 20, 1967, Ser. No. 684,231
Int. Cl. B01d 1/24; B01j 9/02
U.S. Cl. 159—23
7 Claims

ABSTRACT OF THE DISCLOSURE

Method and apparatus for concentrating solutions and suspensions and product thus made, in which the solution, or suspension, is delivered to an evaporator vessel and is heated and subjected to suction to drive off liquid therefrom while the concentrate resulting therefrom is continuously delivered to a filter to form a cake or billet which can be stored indefinitely without deterioration and thereafter crushed, or the cake can be taken directly from the filter and crushed, while the liquid filtrate removed from the concentrate in the filter is returned to the evaporator vessel.

---

This invention relates to a method and apparatus for concentrating solutions, or suspensions, to a dry condition in order to recover the solids dissolved or suspended in a liquid vehicle, and to the product thus made. In particular, the present invention is concerned with a method and apparatus of the nature referred to in which the liquid portion of the suspension, or solution, is water.

It is known that certain waters, occurring naturally, in the form of springs or other deposits are characterized in having therapeutic benefits. Such waters contain dissolved minerals and other compounds which may be iron, or sulphur compounds, or other substances or complexes of that general nature. Heretofore, the only manner of obtaining the benefit of such waters was to travel to the place of occurrence of the waters or to have the waters bottled and shipped to a point of use.

In either case, much time and expense is involved and the benefits of the waters have therefore, in the past, been confined to a few, not only for the foregoing reasons, but also it has long been known that many individuals derive only partial benefits from the waters because of the limits of their bodies to process only a limited quantity of water. Thus the elimination of the water presents the opportunity to take such amounts of the minerals as may be deemed desirable rather than the limited amount heretofore imposed by the capacity of their bodies to assimilate and process the water.

The present invention is directed toward making the benefits of such waters available to anyone interested therein, or needful thereof, and in a convenient and inexpensive manner.

With the foregoing in mind, a particular object of the present invention is the provision of a method and apparatus for concentrating suspensions, or solutions, to obtain the dissolved or suspended materials therefrom in a dry state.

A further object of this invention is the provision of a method and apparatus for converting solutions and suspensions to a dry state by removing the liquid vehicle therefrom so that the dry material can thereafter be capsulized for use in capsule form or can be reconstituted with water to restore the concentrate to substantially its original form.

A further object of the present invention is the provision of a method and apparatus for effecting the concentration of solutions, or suspensions, in a substantially continuous process.

A still further object of this invention is the provision of a method and apparatus for recovering the dissolved or suspended solids from a solution, or suspension, in dry condition and in such a manner that other materials can be added thereto as the material is recovered from the solution or suspension.

A further object of this invention is to provide for and achieve a soft and mild low temperature with the application of about a 2″ to 5″ mercury vacuum thermal and chemical method process apparatus for effecting the concentration of solutions or suspensions by the addition of minute quantities of compatible chemicals, all to be kept well within permissible limits, to induce catalytic or kindred actions to reduce foaming and to induce undesirable inclusions to separate from the liquids as vapor and to be exhausted into condensers for reduction to liquids at atmospheric pressures and temperatures.

The foregoing objects of the present invention, as well as still other objects and advantages, will become more apparent upon reference to the following specification taken in connection with the accompanying drawings in which.

Figure 1:
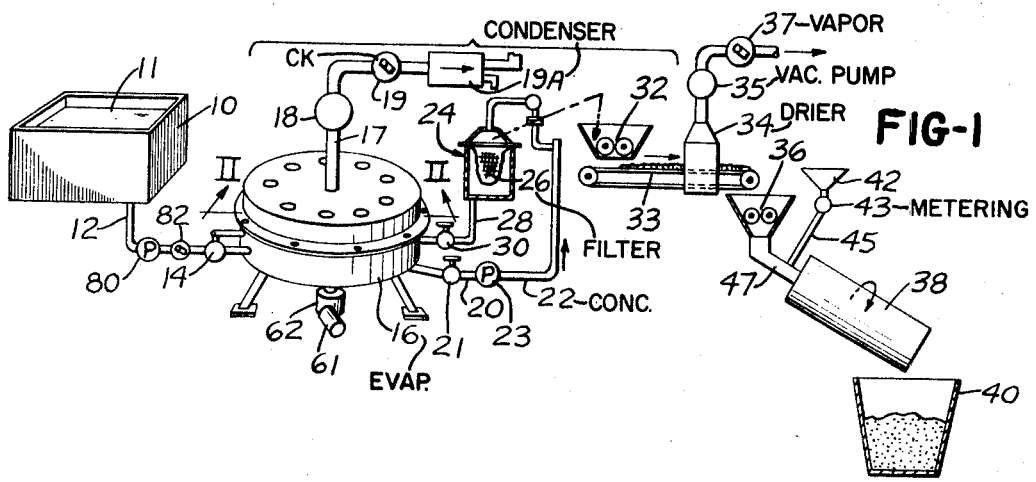
FIG. 1 is a somewhat schematic perspective view showing a system according to the present invention.

Referring to the drawings somewhat more in detail in FIG. 1, 10 is a supply tank representing a source of supply for a suspension or solution, or combination thereof, indicated at 11. As mentioned before, this may consist of a mineral water such as is found in certain regions and in which has therapeutic benefit for certain individuals in connection with certain complaints. Tank 11 is connected by conduit 12 through a float operated valve 14 with an evaporator tank 16. A conduit 17 leads from the cover of evaporator tank 16 to a suction pump 18 and from suction pump 18 gases are discharged through a check valve 19 to a condenser 19A from which uncondensed vapors pass to the atmosphere while a certain fraction will condense to a recoverable liquid. In connection with a water being concentrated, the gases or vapors passing through conduit 17 would, in the main, be steam.

From the bottom portion of evaporator 16 another conduit 20 leads through a shut-off valve 21 to a pump 23 which discharges into a conduit 22. Conduit 22 leads to a filter unit generally indicated at 24 and having therein a mesh filter bag 26. Liquid which passes through filter bag 26 is conveyed via conduit 28 and shut-off valve 30 back into evaporator 16.

The cake or billet which builds up in bag 26 may be removed and stored or may be immediately delivered to a crushing device as represented by rolls 32. The crushed filter cake is deposited on a conveyor 33 and is conveyed thereby through a drier 34. Drier 34 may have heating means therein and is subjected to suction by a suction pump 35 and the vapors drawn off from the drying crushed material, mainly, water vapor, is discharged through a check valve 37 to the atmosphere.

The crushed dried material is then passed through another crushing station, as represented by crushing rolls 36, to reduce it to the degree of fineness desired, and is then passed through a mixer or tumbling device 38 to a receiving container 40. Device 38 may include heating means, if so desired, in order further to dry the material to the desired degree.

According to the present invention, a feeder 42 may be provided which can be employed for feeding additional material as through a measuring device 43 and conduit 45 into conduit 47 leading from crushing device 36 to device 38. By the provision of the feeding device at 42 the composition of the material received in receiving container 40 can be controlled and regulated and adjusted so as to be exactly what is desired and may include additives beyond what is obtained from the water being evaporated, if so desired.

Figure 2:
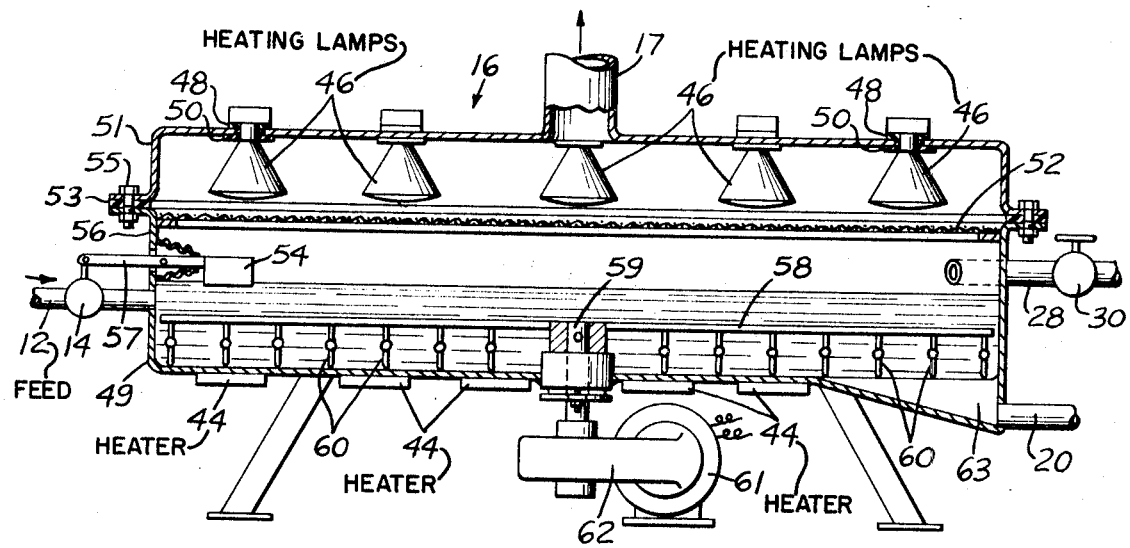
FIG. 2 is a section through an important element of the system and is indicated by line II—II on FIG. 1.

Turning now to FIG. 2, the evaporator, tank generally indicated at 16 in FIG. 1, is shown more in detail. The evaporator tank includes a pan-like lower part 49 which is advantageously formed of Monel metal or which may be a steel shell lined with Monel metal. Lower portion 49 is flanged at the top and a top portion 51, flanged at the bottom, rests thereon with an intervening gasket 53 and clamping means as represented by the bolts 55. The evaporator tank thus forms a tight container into which the water is supplied by conduit 12 via float control valve 14.

With reference to valve 14, it will be seen to have an actuating arm 57 and a float 54 on the inner end of the actuating arm which is preferably sealed to the wall of the evaporator tank 16 by means of a bellows 56 or some other flexible sealing means. Float control valve 14 is operable for maintaining the liquid level in the evaporator at a substantially constant point.

Attached to the bottom wall of the evaporator vessel are electrical heating elements 44. These heating elements raise the temperature of the liquid within the evaporator vessel to the point that vapor is rapidly given off therefrom. It will be understood that gas heating or other heating means could be employed for heating the vessel, if so desired; the electrical heating elements 44 merely being exemplary of some manner of supplying heat at a controlled rate to the evaporator vessel.

It has been found advantageous to include infrared radiating lamps 46 in the cover 51 of the vessel in order to assist in the evaporation of the liquid therefrom. Lamps 46 are particularly beneficial because the heat therefrom impinges directly on the upper surface of the liquid and from which the vapor passes. Lamps 46 preferably are arranged in a circular path in the cover and may be sealed in the cover as by rubber-like gasket means 50 which are threaded into sockets 48.

Advantageously, a screen 52 is provided either in the upper part of the lower portion of the evaporator vessel or in the lower portion of the upper part so as to prevent glass from the lamps 46 from getting into the liquid in the event any of the lamps break in use.

Figure 4:
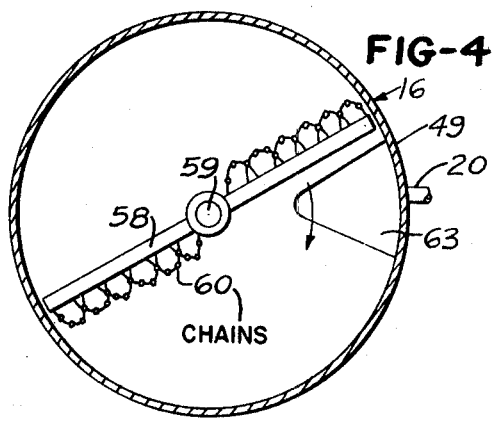
FIG. 4 is a plan view showing an agitator arrangement for use in connection with the element illustrated in FIG. 2.

FIG. 2 will also show that there is a rotary agitator 58 in the evaporator vessel mounted on a shaft 59 driven by a motor 61 by way of a speed reducing gear head 62 forming a part thereof. The agitator 58 consists of two or more arms and carried by the arms are a plurality of chain members 60 which, as will be seen in FIG. 4, may be in the form of loops of chain dragging behind the respective arms of the agitator so as continuously to scrape the bottom of the container so as to maintain the concentrate which accumulates therein in a state of agitation and to prevent caking thereof and also to advance the concentrate toward the discharge well 63 formed in one side of the bottom of the evaporator vessel to which the discharge conduit 20 is connected.

It will be understood that other scraping means could be employed so long as the functions described above were carried out, namely preventing the concentrate from caking on the bottom of the evaporator vessel and continuously moving the concentrate toward the concentrate discharge point from the vessel.

Figure 3:
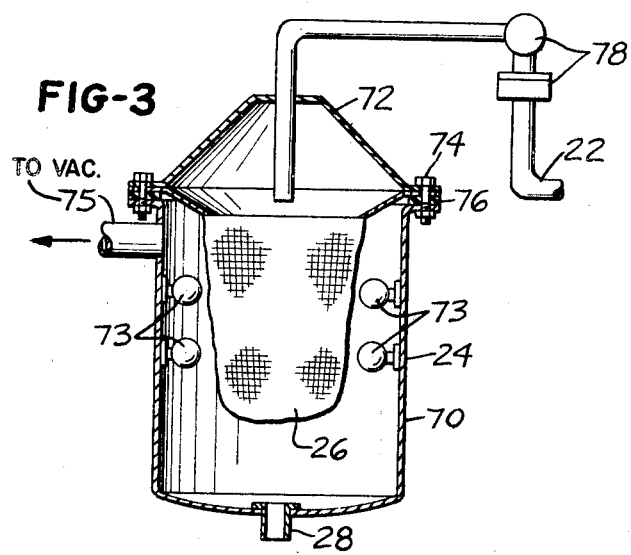
FIG. 3 is a vertical section, drawn somewhat in enlarged scale, showing a filter unit according to the present invention.

Referring to FIG. 3, it will be seen that filter 24 comprises a flanged well-like casing 70 having a cover 72 secured thereto as by bolts 74, or other suitable clamp means, and with an interposed gasket 76 sealing cover 72 to lower portion 70. The conduit 22 through which the concentrate is delivered from evaporator vessel 16 to the filter, preferably comprises one or more swivel joints 78 so that when the clamp means holding the filter cover to the bottom portion are loosened, the cover can be raised upwardly and the filter bag 26 lifted therefrom and the cake which has built up in the filter bag can, then, readily be removed therefrom and transferred to crusher or rolls 32.

When the cake is to be stored, heating means, such as heat lamp 73, are provided in casing 70 so the cake will dry to a billet in bag 26. A suction connection at 75 can be employed to withdraw vapors from the inside of casing 70. The dry cake, or billet, can be stored indefinitely without deterioration, or can be crushed immediately.

The described arrangement is characterized in being a substantially continuous process, with the only interruption of the process taking place during the short interval of time that the filter cake is being removed from the filter bag 26. This requires only a short length of time and can readily be accomplished without shutting down the evaporator unit merely by closing valves 21 and 30, and then opening the filter and removing the bag therefrom. The cake may then be removed from the bag and the bag returned to the filter, or a new bag placed in the filter, and the filter is again closed. Upon opening of valves 21 and 30, the unit is immediately restored to full operative condition.

It will be apparent that pump 23 may develop sufficient pressure on the liquid to cause efficient operation of the filter and that it may even force the liquid from about filter bag 26 back through conduit 28 and shut-off valve 30 into the evaporator vessel when the filter is the simple type shown in FIG. 1. It will further be evident that a pump 80 could be included in conduit 12, if so desired, and that a check valve 82 can further be included in this line in order to prevent reverse flow of liquid in conduit 12.

By the provision of pump 80, the water could be drawn from a lower level upwardly into the evaporator vessel instead of being transferred thereto by gravity as shown in FIG. 1.

The temperature in the evaporator tank can be maintained below the boiling point of the liquid and rapid evaporation of the water, or other solvent, will still take place at a relatively rapid rate due to the suction drawn on the interior of the evaporator vessel by way of conduit 17 and because of the manner in which the heat is being supplied to the solution, or suspension, within the evaporator vessel. The temperature may, for example, be around 200 to 210 degrees Fahrenheit and, at this time, no change will occur in the solids that are dissolved, or suspended, in the liquid. If, in view of the applied suction, which, for water, is on the order of about 2″ to 5″ of mercury, the liquid tends to boil at the above mentioned temperatures, the temperature is reduced until evaporation without boiling occurs.

The water advantageously has placed therein an antifoaming agent of a known composition, dimethylpolysiloxane, for exmple. Other additives are, of course, possible so long as the end product is not adversely influenced or contaminated thereby.

The finely granulated product received in the container 40 may be packaged in any suitable manner, for example, in the form of capsules, or it may be boxed or bottled in bulk form.

Depending upon the particular water being concentrated, it may require as much as 67 gallons of water to produce a quantity of concentrate on the order of 33 ounces, varying up to 13%, depending upon the level of the water table.

It will be appreciated that the dry concentrate can readily be reconstituted with fresh water, such as distilled water, to arrive at a product substantially identical with that originally delivered to the evaporator vessel. Alternatively, the concentrate can be taken in dry form and the benefits of a large quantity of water thus obtained in a simple manner.

It will be understood that this invention is susceptible to modification in order to adapt it to different usages and conditions; and accordingly, it is desired to comprehend such modifications within this invention as may fall within the scope of the appended claims.

What is claimed is:

1. A method of recovering solids dissolved or suspended in mineral water which comprises: establishing a body of mineral water to be concentrated in a closed drum-like evaporation vessel, maintaining the level of said body of water in the vessel constant, supplying heat by conduction to the bottom of the body of water in the vessel and supplying heat by radiation to the top of the body of water in the vessel to cause the water to evaporate, applying suction to the vessel at the top so as to continuously withdraw water vapor from said vessel, continuously withdrawing water with a concentration of said solids therein from the vessel at the bottom and moving the thus withdrawn water with said concentration of solids therein in a closed path from the vessel through a filter and then back to said vessel whereby solids accumulate in said filter, and periodically removing the thus removed solids from the filter and crushing the solids to a fine particulate form.

2. An apparatus for recovering solids dissolved or suspended in mineral water and comprising: a closed drum-like evaporator vessel, a conduit connected to the vessel for supplying the mineral water to be concentrated to said vessel, means responsive to the water level in said vessel for regulating the rate of water flow in said conduit for maintaining the water level in said vessel at a predetermined level a substantial distance below the top of the vessel, means for supplying heat to the water in the vessel, suction means connected to the top of said vessel to withdraw water vapor therefrom, a closed filter, conduit means leading from the bottom of said vessel to the inlet of said filter for conveying concentrated water from said vessel to said filter to filter the solids therefrom, other conduit means leading from the filter outlet back to said vessel for returning the filtered water from the filter to the vessel after removal of solids from the water, said conduit means and filter forming a closed path, pump means in said path to cause the water to circulate therein and through said filter, means in said filter for drying the filter cake in the filter so the cake is in a substantially dry condition when it is removed from the filter, and means for removing from the filter the filter cake formed therein by the filtered out solids.

3. An apparatus according to claim 2, which includes crushing means for receiving the dried filter cake removed from said filter and for crushing the said filter cake.

4. An apparatus according to claim 2, in which said vessel includes means to scrape solids from the bottom thereof to prevent caking of the solids in the vessel.

5. An apparatus according to claim 2, which includes a conveyor receiving the crushed filter cake from said crusher means and operable for conveying the crushed filter cake to a point of discharge, and a second crushing means receiving the crushed material from the conveyor at said point of discharge and operable for further crushing the material to a desired size.

6. An apparatus according to claim 2, which includes means for supplying an additive to said material as it leaves said second crushing means, and mixing means receiving the material from said second crushing means together with any additive supplied thereto and operable for mixing the material and additives to a substantially homogeneous state.

7. An apparatus according to claim 2, in which the means for supplying heat to the water in said vessel comprises, first heating means for supplying heat to the bottom wall of the vessel for conduction into the water in the vessel, and second heating means in the form of radiant heater means in the vessel above the water for supplying radiant heat to the upper surface of the water in the vessel.

References Cited

UNITED STATES PATENTS

| 1,850,154 | 3/1932 | Raspe et al. | 159—48 X |
| 2,561,392 | 7/1951 | Marshall | 117—100 |
| 3,205,588 | 9/1965 | Oetjen et al. | 34—5 |
| 3,323,575 | 6/1967 | Greenfield. | |
| 3,355,366 | 11/1967 | Beard | 203—20 |
| 2,448,191 | 8/1948 | Pike | 23—296 |
| 2,576,496 | 11/1951 | Ziegler | 159—44 X |
| 3,432,258 | 3/1969 | Ferris | 209—166 X |

FOREIGN PATENTS

| 24,457 | 1894 | Great Britain. |
| 876,676 | 9/1961 | Great Britain. |

NORMAN YUDKOFF, Primary Examiner

J. SOFER, Assistant Examiner

U.S. Cl. X.R.

159—1, 31, 45; 210—152